US008795845B2

(12) United States Patent
Perepezko et al.

(10) Patent No.: US 8,795,845 B2
(45) Date of Patent: Aug. 5, 2014

(54) LOW-TEMPERATURE SYNTHESIS OF INTEGRATED COATINGS FOR CORROSION RESISTANCE

(75) Inventors: John Harry Perepezko, Madison, WI (US); Ridwan Sakidja, Madison, WI (US)

(73) Assignee: Wisconsin Alumni Research Foundation, Madison, WI (US)

(*) Notice: Subject to any disclaimer, the term of this patent is extended or adjusted under 35 U.S.C. 154(b) by 436 days.

(21) Appl. No.: 12/268,153

(22) Filed: Nov. 10, 2008

(65) Prior Publication Data

US 2010/0119866 A1    May 13, 2010

(51) Int. Cl.
| | |
|---|---|
| B32B 15/01 | (2006.01) |
| B32B 15/04 | (2006.01) |
| B32B 15/18 | (2006.01) |
| B32B 15/20 | (2006.01) |
| C23C 16/06 | (2006.01) |
| C23C 16/30 | (2006.01) |
| C23C 16/28 | (2006.01) |
| C23C 28/00 | (2006.01) |
| C23C 30/00 | (2006.01) |

(52) U.S. Cl.
USPC ........... 428/615; 428/621; 428/653; 428/627; 428/684; 428/332; 428/661; 428/610

(58) Field of Classification Search
USPC ......... 428/621, 615, 653, 666, 681, 627, 651, 428/652, 654, 680, 682, 684, 685, 686, 667, 428/332, 658, 659, 661, 660, 662, 663, 664, 428/665, 668, 669, 610, 672, 673, 674, 675, 428/676, 677, 655, 656, 657
See application file for complete search history.

(56) References Cited

U.S. PATENT DOCUMENTS

| | | | |
|---|---|---|---|
| 5,981,089 A | 11/1999 | Imai et al. | |
| 2006/0228475 A1 | 10/2006 | Perepezko et al. | |
| 2007/0212565 A1* | 9/2007 | Urushihara et al. | .......... 428/577 |
| 2008/0081214 A1 | 4/2008 | Narita et al. | |

FOREIGN PATENT DOCUMENTS

| | | |
|---|---|---|
| JP | 09104962 | 4/1997 |
| JP | 2006219740 | 8/2006 |
| JP | 2008069403 | 3/2008 |

OTHER PUBLICATIONS

Luo et al., "Complex Boronized Layer on the Hot-Dip Aluminized Steels and Its Surface Performances," Trans. Mat. Heat Treatment Proc. 14$^{th}$ IFHTSE Congress, vol. 25, No. 5, Oct. 2004, pp. 653-656.*
Q235 DataSheet, "Chemical Composition, . . . , Q235 Steel", downloaded from www.steel-grades.com on Sep. 24, 2012 (no date).*
International Search Report and the Written Opinion of the International Searching Authority received in PCT/US2009/062824, Jul. 2, 2010.

(Continued)

Primary Examiner — Michael E La Villa
(74) Attorney, Agent, or Firm — Bell & Manning, LLC

(57) ABSTRACT

Methods for the low-temperature synthesis of an integrated, corrosion-resistant coating structure for metal substrates by means of multi-component pack cementation are provided. The synthesis of the integrated coating structures at low temperatures can avoid or minimize degradation of the mechanical properties of the substrates. The integrated coating structures can increase the lifetime of high temperature steels under severe steam environments and, therefore, provide a technological enabler for the high-temperature operation of steam power generation plants.

31 Claims, 13 Drawing Sheets

(56) References Cited

OTHER PUBLICATIONS

Bianco, R. et al., "Codepositing Elements by Halide-Activated Pack Cementation," JOM, Nov. 1991, pp. 68-73.

Chen, Fan-Shiong et al., "The kinetics and mechanism of multi-component diffusion on AISI 1045 steel," Surface and Coatings Technology 115, Feb. 1999, pp. 239-248.

Choquet, P.A. et al., "Simultaneous Chromizing and Aluminizing of Iron-base Alloys," Materials Science and Engineering, Al21, Mar. 1989, pp. 413-418.

Galmiche, P., "Chromaluminisation and tantalization of refractory materials for gas turbines," Metals and Materials, Aug. 1968, pp. 241-248.

Godlewski, K. et al., "The Effect of Chromium on the Corrosion Resistance of Aluminide Coatings on Nickel and Nickel-based Substrates," Materials Science and Engineering 88, 1987, pp. 103-109.

Johnson, W. et al., "Thermodynamic Properties of Solid Cr-Al Alloys at 1000° C.," Transactions of the Metallurgical Society of AIME, vol. 242, Aug. 1968, pp. 1685-1688.

Kim, M.T. et al., "Codeposition of Al and Si onto a low carbon steel using silicon dioxide and aluminum and its hot temperature oxidation properties," Surface and Coatings Technology 161, Jul. 2002, pp. 218-223.

Kung, S.C. et al., "Fundamental Kinetic Study of Aluminization of Iron by Pack Cementation at 900 ° C.," Surface and Coatings Technology, 32, Feb. 1987, pp. 41-56.

Miller, D.M. et al., "Simultaneous Chromizing—Aluminizing Coating of Austenitic Stainless Steels," Oxidation of Metals, vol. 29, Nos. 3/4, 1988, pp. 239-254.

Noiri, B. et al., "Etude Thermodynamique de L'Aluminisation du Fer et des Aciers par Voie Thermochimique," Journal of the Less-Common Metals, 95, 1983, pp. 55-72.

Ravi, V.A. et al., "Simultaneous Chromizing-Aluminizing Coating of Nickel and Nickel-Base Superalloys," Mat. Res. Soc. Symp. Proc., vol. 133, 1989, pp. 543-547.

Zakhariev, Z. et al., "Gas phase reactions during simultaneous boronizing and aluminizing of steels," Journal of Alloys and Compounds, 196, 1993, pp. 59-62.

\* cited by examiner

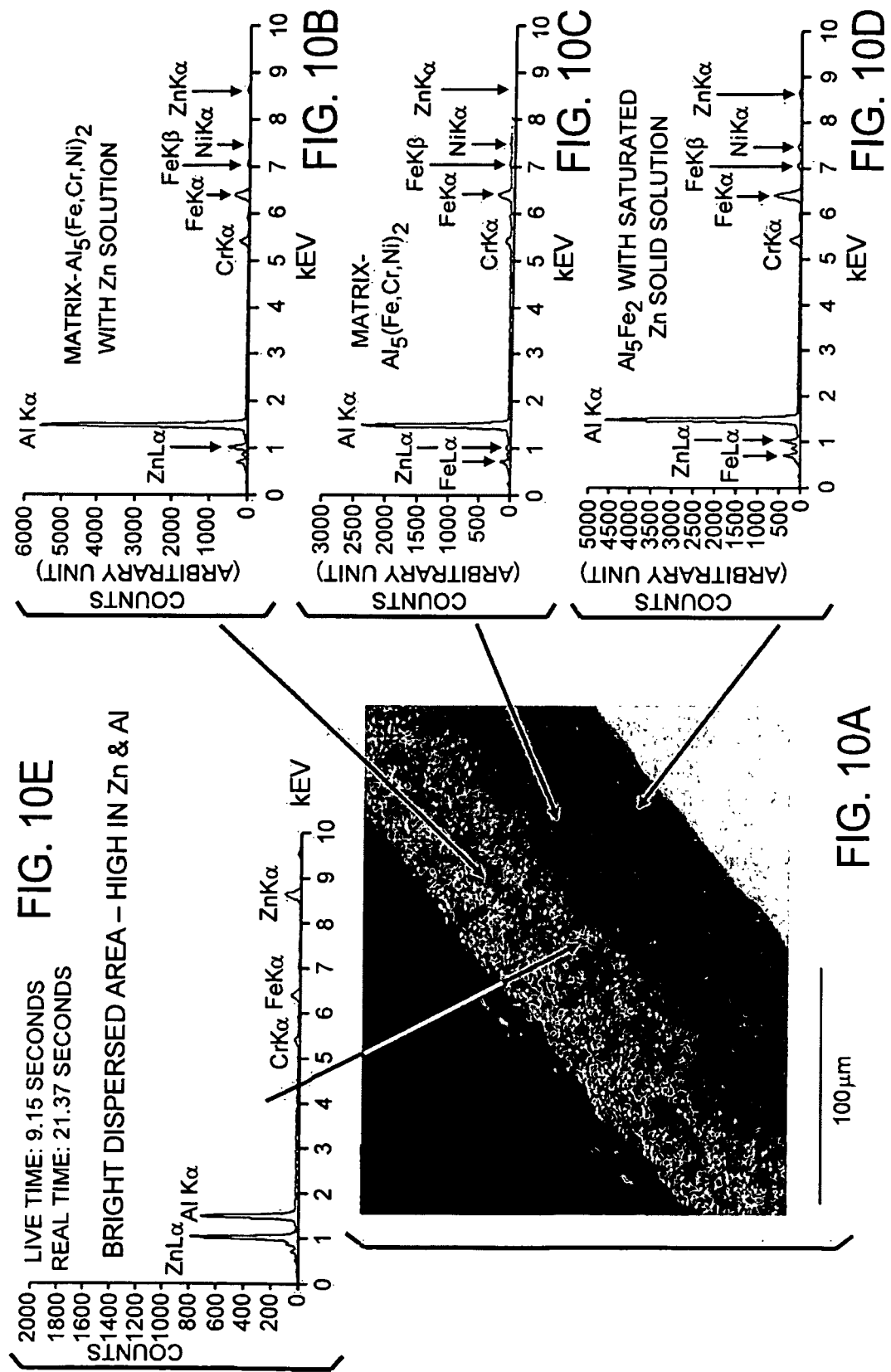

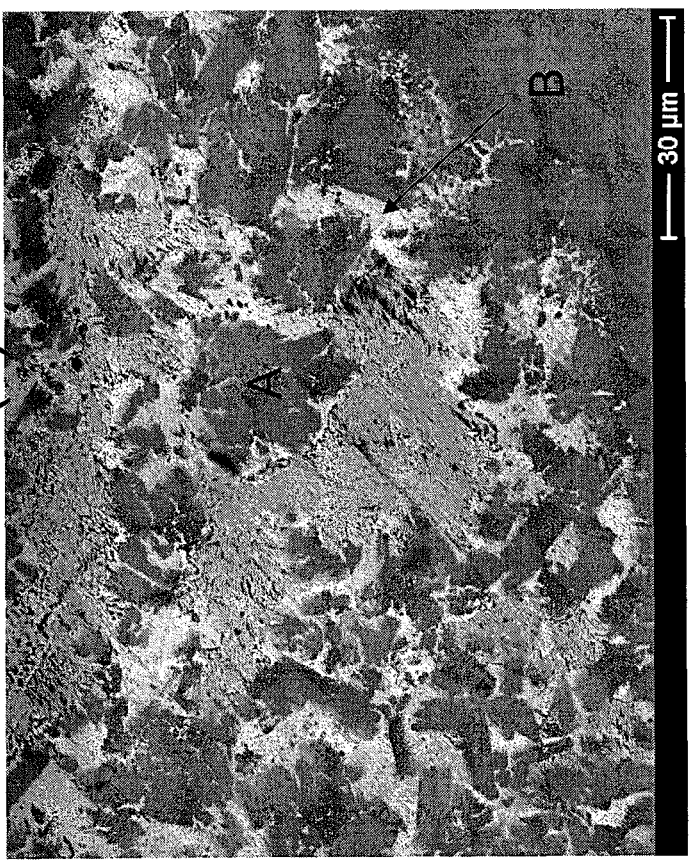
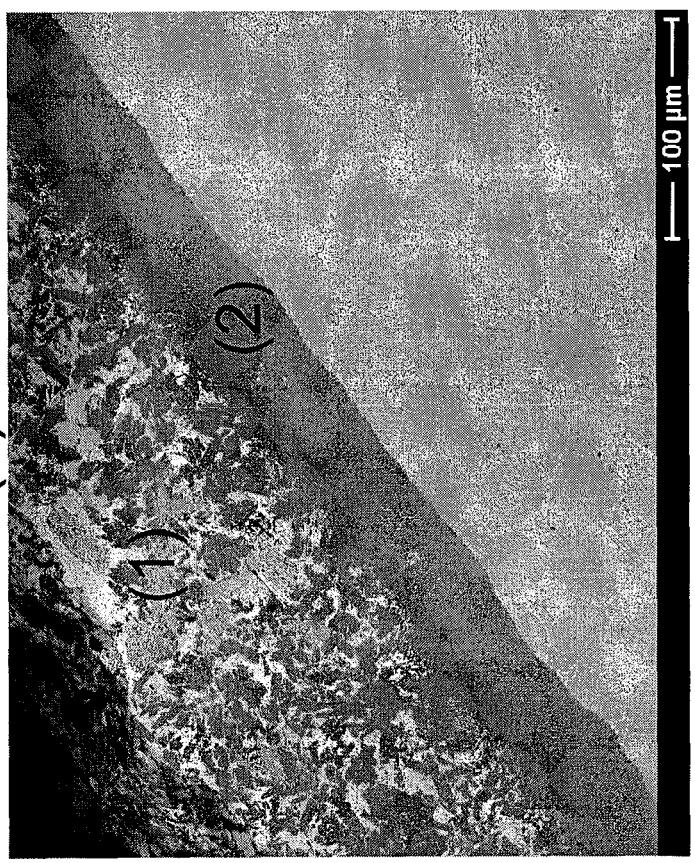
FIG. 11

LOW-TEMPERATURE SYNTHESIS OF INTEGRATED COATINGS FOR CORROSION RESISTANCE

STATEMENT REGARDING FEDERALLY SPONSORED RESEARCH OR DEVELOPMENT

This invention was made with United States government support awarded by the following agencies: NAVY/ONR N00014-02-1-0004. The United States government has certain rights in this invention.

BACKGROUND

A key contemporary engineering challenge is the societal need to improve the conversion efficiency of current steam power plants to reduce carbon gas emission into the environment. The demand for higher thermal efficiency translates into the need to increase the operating temperature of the power plants. This is especially critical for high-temperature alloys such as Cr—Mo steels that are normally used in steam power generation plants. The Cr—Mo steels typically develop Cr-based oxides that are not fully protective at temperatures above 550° C. Oxidation products yield scales that tend to spall so that there is a consequent metal cross section loss, blockage and erosion of components located downstream and overheating.

Higher temperature requirements necessitate structural steels that can sustain the higher temperatures from both a mechanical and environmental perspective. There has been an array of alloying work concentrated on improving the mechanical properties of the candidate high-temperature structural steels, especially the 9Cr-1Mo-0.1C (wt. %) P92 steels which have emerged as a model alloy steel. See, for example, Sawada K, Kubo K, Abe F., "Creep Behavior and Stability of MX Precipitates Reactions During Creep of an advanced 9% Chromium Steel", *Mat. Sci. & Eng. A* 2001; 319-321:787-787; Maile K., Klenk A., Roos E., Husemann R-U, Helmrich A., "Development and Qualification of New Boiler and Piping Materials for High Efficiency USC Plants", *Proc. 4th. Int. Conf Advances in Mat, Tech. for Fossil Power Plants,* 2005: 152-164; F, Taneika M., Sawada L., "Alloy Design of Creep-Resistant 9Cr Steel Using a Dispersion of Nano-Sized Carbonitrides", *Int. J. Press. Vessels. Pip.* 2007; 84(1-2):3-12.; Ennis P. J., Zielinskalipiec A., Wachter O., Czyrska-Filemonowicz A., "Microstructural Stability and Creep Rupture Strength of the Martensitic Steel P92 For Advanced Power Plant", *Acta Materialia,* 1997; 45:4901-4907; Brozda J., Pasternak J., "Weldability Evaluation of Martensitic Heat Resisting Chromium Steels with Tungsten Additions and Properties of Welded Joints", *Proc. 4th. Int. Conf. Advances in Mat. Tech. for Fossil Power Plants,* 2005: 967-986; and Dryepondt S., Zhang Y., Pint B. A., "Creep and Corrosion Testing of Aluminide Coatings on Ferritic-martensitic Substrates", *Surface & Coatings Technology,* 201 (7): 3880-3884. The extensive chemical modifications were aimed at enhancing the creep resistance up to 700° C. This involved the addition of elements such as B, Si, V, Nb and W. See, for example, Xiang, Z. D., Datta, P. K., "Relationship Between Pack Chemistry and Aluminide Coating Formation for Low-Temperature Aluminisation of Alloy Steels", *Acta Materialia,* 2006; 54:4453-4463; Dryepondt S., Zhang, Y., Pint, B. A., "Creep and Corrosion Testing of Aluminide Coatings on Ferritic-martensitic Substrates", *Surface & Coatings Technology,* 201(7):3880-3884; Maziasz, P. J., Shingledecker, J. P., Pint, B. A., Evans, N. D., Yamamoto, Y., More, K., Lara-Curzio, E., "Overview of Creep Strength and Oxidation of Heat-Resistant Alloy Sheets and Foils for Compact Heat Exchangers", *Trans. ASME. The Journal of Turbomachinery,* 2006, 128(4):814-819. The modified Cr—Mo steels however remain susceptible to rapid oxidation both in air and, more importantly, in supercritical steam at 650° C.

An in-situ Al-rich iron-aluminide coating has emerged as a leading candidate for high temperature oxidation protection. Unlike chromia or silica, alumina provides excellent oxidation protection even under supercritical steam environments. In this regard, the pack cementation aluminide coating process represents one of the most cost effective and robust methods to coat the alloy steel. The primary obstacle for widespread application of the iron-aluminide coatings has been difficulty in enriching the P92 steel at a low enough temperature, as to avoid degradation of the mechanical properties. The second major obstacle for the use of aluminide coatings has been the concern that the high and prolonged thermal exposure in operation will lead to a severe degradation of the coatings, primarily by means of the depletion of the Al-rich phases within the aluminide coatings through inward diffusion into the substrate.

Until recently, the high temperature requirement for the pack cementation process remained a major obstacle to enrich P92 steels with Al without significant mechanical property degradation. Extensive studies on Al pack cementation using various types of activator ($AlCl_3$, $AlF_3$, $NH_4F$, $NH_4Cl$) pointed to the need for temperatures above 900° C. for the pack process to generate sufficiently high partial pressures of the active carrier gases for the chemical deposition. See, Hocking, M. G., Vasantasree, V., Sidky, P. S., "Coatings by Pack, Slurry, Sol-Gel, Hot-Dip, Electrochemical and Chemical Methods", Bath Press, Avon, UK: *Longman Scientific & Technical,* 1989. The conclusion had been that while the aluminide coating can perform very well under a steam environment and provides excellent oxidation protection, the necessary high temperature severely limits its applicability. There have been attempts to examine a low-temperature Al pack aluminizing into P92 steels as a feasible process. See, for example, Xiang, Z. D., Datta, P. K., "Formation of Aluminide Coatings on Low Alloy Steels at 650° C. by Pack Cementation Process", *Mater. Sci. and Tech.,* 2004, 20:1297-1302; Xiang, Z. D., Datta, P. K., "Relationship Between Pack Chemistry and Aluminide Coating Formation for Low-Temperature Aluminisation of Alloy Steels", *Acta Materialia,* 2006, 54:4453-4463. The work performed by Xiang et. al., using $AlCl_3$ activator and an Al depositing powder source, demonstrated the ability to coat Cr—Mo steels. See, for example Xiang, Z. D., Datta, P. K., "Relationship Between Pack Chemistry and Aluminide Coating Formation for Low-Temperature Aluminisation of Alloy Steels", *Acta Materialia,* 2006, 54:4453-4463.

SUMMARY

Integrated coating structures for metal substrates, such as steel substrates, and methods for forming the integrated coating structures are provided. The integrated coating structures can enhance the corrosion resistance of an underlying metal substrate and are suited for use in high-temperature, high-humidity environments, such as those found in steam power generation plants.

A basic embodiment of an integrated coating structure includes a substrate composed of an alloy comprising metal elements and a coating integrated with a surface of the substrate. The coating includes a corrosion resistant layer comprising a material having a defect structure that facilitates the diffusion of an alloying element through the material and a diffusion barrier underlying the corrosion resistant layer and integrated into the surface of the substrate. The diffusion barrier hinders the diffusion of the alloying element relative to the corrosion resistant layer and includes a compound comprising at least one diffusion barrier-forming element and at least one of the alloying element or a substrate alloy metal element. In one embodiment, the diffusion barrier includes an intermetallic compound comprising at least one simple metal or metalloid and at least one substrate alloy metal element or the alloying element. The integrated coating structure may further include an oxidation barrier comprising a metal oxide on the external surface of the corrosion resistant layer.

One specific embodiment of an integrated coating structure is an integrated aluminide-based coating structure that includes a substrate comprising a steel alloy and a corrosion-resistant coating integrated with a surface of the substrate. The coating includes a corrosion resistant layer comprising $Al_5Fe_2$ and a diffusion barrier underlying the corrosion resistant layer and integrated into the surface of the substrate. In this embodiment, the diffusion barrier can include at least one intermetallic compound comprising a simple metal or metalloid and at least one of aluminum or iron.

A method of forming the integrated coating structures includes the steps of depositing a simple metal or metalloid and an alloying element onto a substrate composed of an alloy comprising metal elements. In one embodiment, the deposition can be achieved via pack cementation at a temperature of no greater than about 700° C. to provide a pack cementation coating and exposing the pack cementation coating to an elevated temperature for a period of time sufficient to form an integrated coating structure. Other deposition processes, such as thermal spray, vapor deposition and electrodeposition can also be employed. In some embodiments the deposition temperature may be no greater than the melting temperature of the alloying element. The resulting integrated coating structure includes the substrate, a corrosion resistant layer comprising a material having a defect structure that facilitates the diffusion of the alloying element through the material, and a diffusion barrier underlying the corrosion resistant layer and integrated into a surface of the substrate, the diffusion barrier comprising at least diffusion barrier-forming element (e.g., a simple metal or metalloid) and at least one substrate alloy metal element or the alloying element.

One variation of the above-described method further includes exposing the coating to an elevated temperature after the deposition step for a period of time sufficient to form the integrated coating structure.

Also provided is an integrated coating structure that does not include a diffusion barrier-forming element. This structure comprises a substrate alloy comprising metal elements, and a coating integrated with a surface of the substrate alloy, the coating comprising a corrosion resistant layer comprising a material having a defect structure that facilitates the diffusion of an alloying element through the material and a diffusion barrier underlying the corrosion resistant layer and integrated into the surface of the substrate alloy. In this embodiment, the diffusion barrier comprises at least one intermetallic compound comprising the alloying element and at least one substrate alloy metal element. The coating integrated into the surface can have a thickness of at least about 100 μm, as measured from a depth within the coating structure at which the structure becomes pure substrate material to the outer surface of the corrosion resistant layer or, if present, the oxidation barrier. This includes embodiments wherein the coating integrated into the surface has a thickness of at least about 200 μm, and further includes embodiments wherein the coating integrated into the surface has a thickness of at least about 250 μm.

Also provided is a method of forming the integrated coating structure that does not include a diffusion barrier-forming element. The method includes depositing the diffusion barrier-forming element and the alloying element onto the substrate alloy via pack cementation at a temperature no greater than 700° C. to form the integrated coating structure. One variation of this method further includes exposing the coating to an elevated temperature after deposition for a period of time sufficient to form the integrated coating.

BRIEF DESCRIPTION OF THE DRAWINGS

FIG. 10 shows (a) a scanning electron micrograph (SEM) of a coating structure fabricated using a pack co-deposition of zinc and aluminum; and (b)-(e) EDS spectra of the various layers in the coating structure of FIG. 10(a).

FIG. 11 shows SEM images of a cross-section of a coating structure fabricated with an Al—Zn co-pack cementation process. FIG. 11(a) shows a layer of: (1) mixed Al-rich Fe-aluminide and a Zn—Al-rich region; and (2) Zn-saturated $Al_5Fe_2$. FIG. 11(b) shows a higher magnification of the region (1) comprised of sub-regions "A" & "B".

DETAILED DESCRIPTION

Methods for the low-temperature synthesis of an integrated, corrosion-resistant coating structure for metal substrates are provided. The synthesis of the integrated coating structures at low temperatures avoids or minimizes degradation of the mechanical properties of the substrates. The integrated coating structures can increase the lifetime of high-temperature steels under severe steam and other corrosive environments and, therefore, can provide a technological enabler for the high-temperature operation of steam power generation plants.

Figure 1:
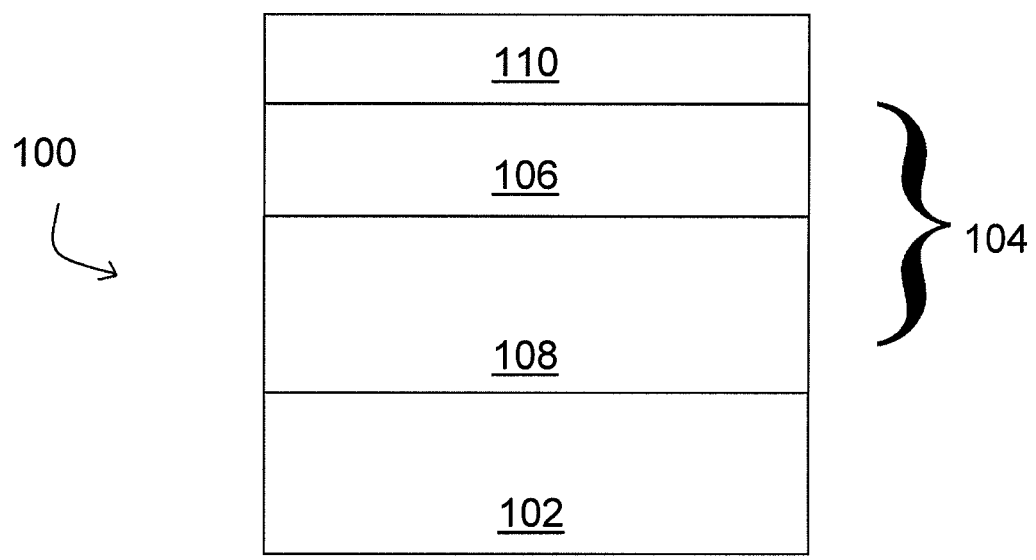
FIG. 1 is a schematic, cross-sectional view of an integrated coating structure.

FIG. 1 shows a schematic cross-sectional view of a basic embodiment of an integrated coating structure. In this embodiment, the integrated coating structure 100 includes a substrate 102 comprising an alloy of metal elements and a coating 104 integrated with a surface of the substrate. The integrated coating includes a corrosion resistant layer 106 and a diffusion barrier 108 underlying the corrosion resistant layer and integrated with the substrate. The corrosion resistant layer includes a material having a defect structure that facilitates the diffusion of an alloying element to the underlying substrate at low temperatures. This allows for the efficient and relatively fast onset, and initial sustainability, of corrosion resistant layer formation. The diffusion barrier includes an intermetallic compound and hinders or prevents the diffusion of the alloying element to the underlying substrate. In some embodiments, the diffusion barrier comprises at least one diffusion barrier-forming element, such as a simple metal or metalloid, in addition to the alloying element and/or a substrate metal alloy element. The coating structure can also include an oxidation barrier 110 comprising an oxide overlying the corrosion resistant layer to provide oxidation-resistance to the structure.

Figure 2:
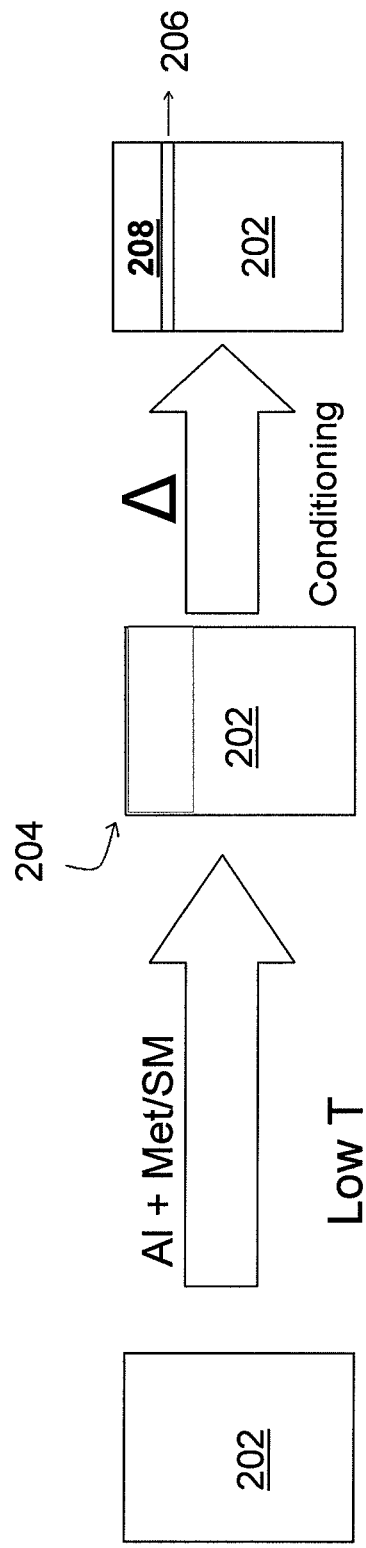
FIG. 2 is a schematic diagram illustrating a method of making an integrated coating structure.

FIG. 2 illustrates a method for making an integrated coating structure. In this method, a simple metal (SM) or metalloid (Met) and an alloying element (e.g., Al) are deposited onto a substrate 202 via pack cementation at a temperature of no greater than about 700° C. (Other deposition processes may also be used.) Pack cementation can be categorized as an extension of CVD (Chemical Vapor Deposition) which takes place at the vapor-solid substrate interface that is surrounded by a mass of depositing medium. (See, ASM HANDBOOK VOL. 13 *Corrosion: Fundamentals, Testing, and Protection*, Stephen D. Cramer and Bernard S. Covina, Jr., Volume Editors, ASM International, Materials Park, Ohio 44073-0002, 2003.) The substrate is 'packed' in a 'cement' composed of a mixture of source alloy/elements, salts as activators (e.g., halides) and an inert filler (e.g., alumina). The alloying element and the simple metal or metalloid can be co-deposited or sequentially deposited via pack cementation. The result is a pack cementation coating 204 comprising one or more intermetallics and/or a metal solid solution on the substrate.

In some instances, the integrated coating structure will form as a result of the deposition process, without the need for further conditioning. In other instances, however, the methods further include a conditioning treatment after the deposition step, during which the deposited coating (e.g., the pack cementation coating) is exposed to elevated temperatures for a period of time sufficient to form the integrated coating structure which includes a diffusion barrier 206 underlying a corrosion resistant layer 208.

The elevated conditioning temperature is desirably, but not necessarily, the same as or less than the deposition temperature. In some embodiments the conditioning is carried out at a temperature of no greater than about 700° C., no greater than about 600° C., or no greater than about 500° C. The period of time for conditioning can be relatively short. For example, for some of the integrated coating structures, the conditioning period can be completed in 30 hours or less. In the case of coating structures used in steam generation plants, the conditioning process can occur during the operation of the plant. Conditioning temperatures similar to those used in steam generation plants can be, for example, from about 500° C. to about 700° C., including from about 600° C. to about 700° C. An oxide layer can be formed on the external surface of the corrosion resistant layer upon exposure of the corrosion resistant layer to air to provide an oxidation barrier that helps to minimize the diffusion of oxygen into the underlying corrosion resistant layer.

The coating that is integrated into the substrate in the present coating structures should be sufficiently thick to significantly extend the lifetime of the underlying substrate. Thus, the integrated coating may be at least about 100 μm thick. This includes embodiments where the integrated coating structure is at least about 200 μm thick, and further include embodiments where the integrated coating structure is at least about 250 μm thick. Because there may not be a sharp interface between the substrate and the diffusion barrier, the thicknesses cited above can be measured from a depth within the integrated coating structure at which the structure is pure substrate material to the outer surface of the corrosion resistant layer or, if present, the oxidation barrier.

A variety of metal substrates can benefit from the integrated coating structures, particularly substrates that tend to corrode, oxidize and/or degrade at high temperatures. For example a ferrous alloy (i.e., an alloy having steel as its majority constituent) may be used as the substrate. Steels, including stainless steels and chromium steels, are examples of suitable substrates. High-temperature chromium molybdenum steels (e.g., 9Cr-1Mo-0.1C (wt. %) P92 steel) that are commonly used in steam power generation plants can be made to withstand higher operating temperatures using the integrated coating structures. Other substrates that can be incorporated into the structures include, but are not limited to, nickel alloy and refractory metal alloy substrates.

Figure 3:
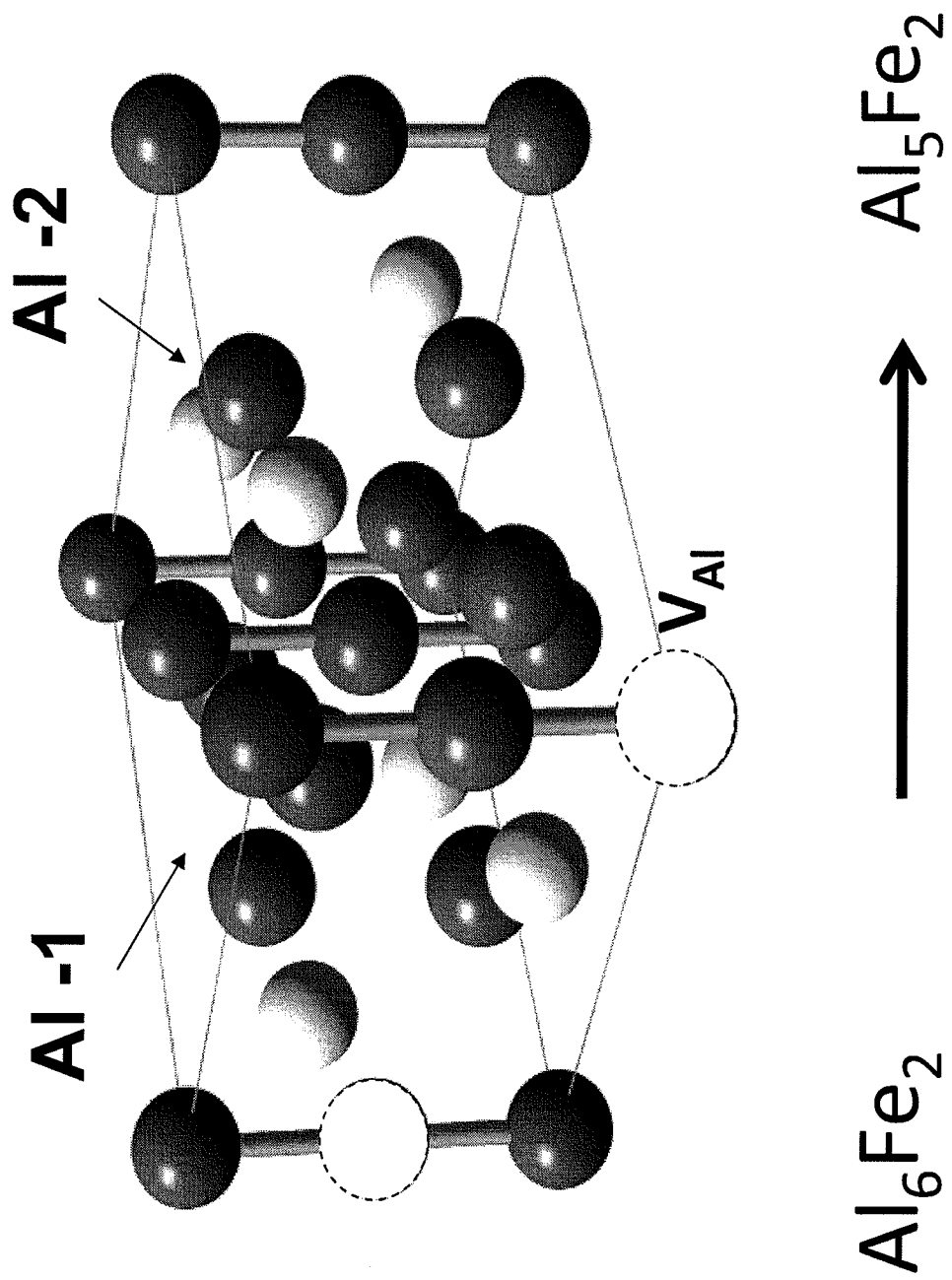
FIG. 3 shows the crystal structure of $Al_5Fe_2$.

The corrosion resistant layer can help protect the metal substrate from corrosion in high-humidity, high-temperature environments, such as those found in steam power generation plants, and may also provide a wear-resistant layer. The corrosion resistant layer may include more than one compound, alloy or intermetallic phase, including a material having a defect structure that facilitates the diffusion of an alloying element through the material. In one embodiment, the defect structure comprises an intermetallic compound having a constitutional vacancy (FIG. 3). The intermetallic compound can include the alloying element and one or more elements from the metal alloy substrate. The alloying element can be any element capable of reacting with the environment to form the corrosion resistant layer. Aluminum is one example of a suitable alloying element. Other examples include silicon, chromium, boron and titanium.

When the alloying element is aluminum and the metal substrate is steel, the corrosion resistant layer can comprise aluminum-rich aluminides, such as $Al_5Fe_2$. The structure of $Al_5Fe_2$ is shown in FIG. 3. As shown in FIG. 3, the $Al_5Fe_2$ phase exhibits a defect structure involving a high concentration of Al constitutional vacancies ($V_{Al}$). More specifically, the $Al_5Fe_2$ phase is characterized by the preference of an Al-poor defect structure (predominantly by the vacancies in the Al sites) relative to its stoichiometric Al to Fe atomic ratio which is 3:1. Thus, the $Al_5Fe_2$ phase constitutes an Al-poor $Al_3Fe$ phase. The crystal structure shows that it is the Al atomic positions at the corners of lattice that possess only a 70% site occupancy which facilitates Al transport within the sites. This structure facilitates low temperature corrosion resistant layer formation by allowing for a high mobility of Al through the $Al_5Fe_2$ phase and, therefore, a high growth rate for the corrosion resistant layer.

Although the material having a defect structure may be the majority phase produced in the corrosion resistant layer other intermetallic phases may also be present. These phases can form, for example, sub-strata or a gradient within the corrosion resistant layer, wherein the concentration of the material having the defect structure is typically highest at the outermost regions of the corrosion resistant layer (i.e., those regions farthest from the substrate). Thus, when the alloying element is aluminum and the metal alloy is steel, various iron aluminides (e.g., FeAl and/or $FeAl_2$, and/or $FeAl_3$), in addition to $Al_5Fe_2$, may be present in the corrosion resistant layer.

The diffusion barrier underlies the corrosion resistant layer and is integrated into the substrate. The diffusion barrier operates by constraining the alloying element diffusion pathways, thereby preventing or significantly slowing the encroachment of the corrosion resistant layer into the underlying substrate. Thus, the formation and growth of the diffusion barrier can act to shut down the continued growth of the corrosion resistant layer. The diffusion barrier includes one or more intermetallic compounds that include at least one substrate alloy metal element and/or the alloying element. In some embodiments, the intermetallic compounds of the diffusion barrier further include at least one diffusion barrier-forming element.

The diffusion barrier-forming element may be any element that, together with the at least one substrate alloy metal element and/or the alloying element, is capable of forming a diffusion barrier for an alloying element. In one embodiment, the diffusion barrier includes one or more intermetallic compounds composed of at least one simple metal or metalloid (the diffusion barrier-forming element) and at least one substrate alloy metal element or the alloying element. In some instances the intermetallic compounds will include ternary phases including the simple metal or metalloid, the alloying element and at least one element from the metal alloy substrate. When the metal alloy substrate is a steel, the at least one metal alloy element in the diffusion barrier will typically be iron. Examples of diffusion barrier-forming elements that may be used to form the compounds of the diffusion barrier include, but are not limited to, elements from Group IB of the periodic table (e.g., Zn), Group VIII of the periodic table (e.g., Fe, Ni and Co), Groups IIIA and IVA of the periodic table (e.g., Al, Si, C, B, Ge and Ga), and Groups VA and VB of the periodic table (e.g., Cr, N and P).

Figure 4:
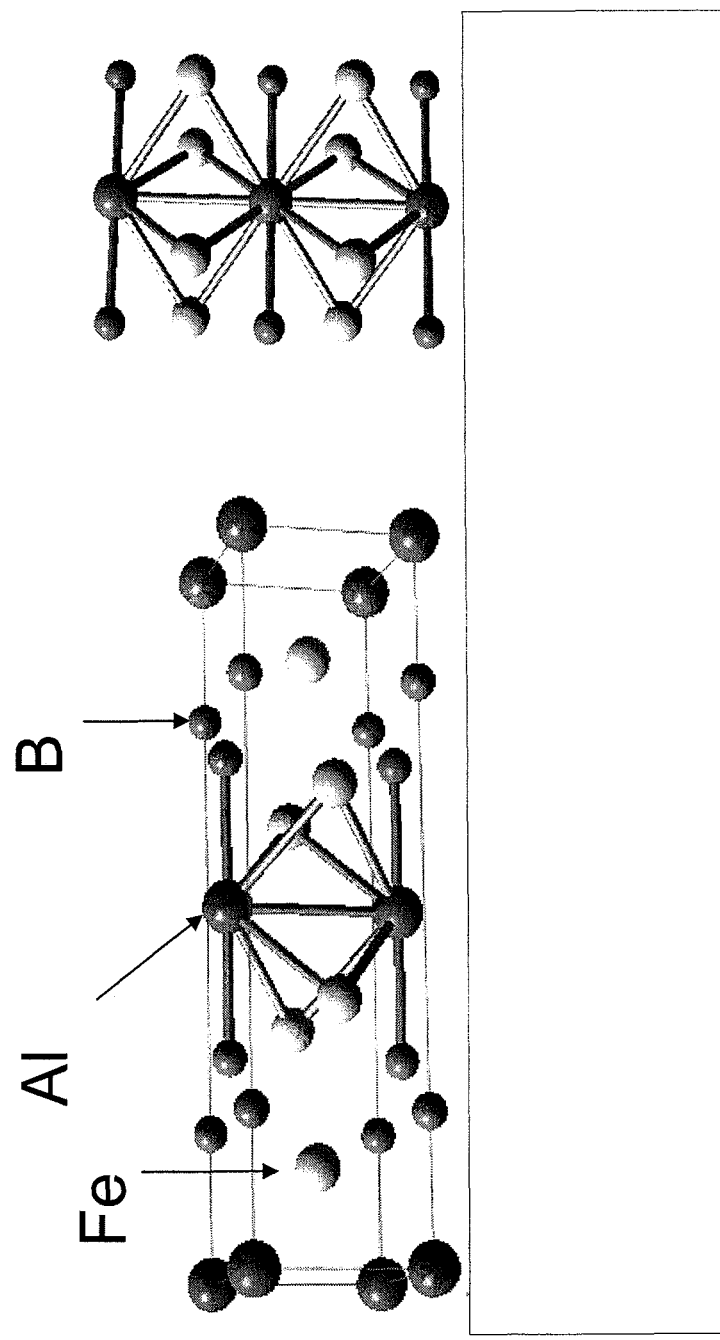
FIG. 4 shows the $Fe_2AlB_2$ crystal structure, wherein an Al atom is surrounded by Fe and B atoms.

In some embodiments the diffusion barrier is free, or substantially free, of the alloying element, while in other embodiments the alloying element is included in the intermetallics of the diffusion barrier. (A diffusion barrier may be considered 'substantially free of' an alloying element if the alloying element is present only in an interfacial region where the corrosion resistant layer and the diffusion barrier come together, but is not present in a significant portion of the underlying region of the diffusion barrier.) In either embodiment, the intermetallic phases desirably include few, or no, constitutional vacancies for the alloying element. Such is the case for a diffusion barrier comprising $Fe_2AlB_2$, the structure of which is shown in FIG. 4. As shown in FIG. 4, in the ternary alumino-boride phase $Fe_2AlB_2$, Al atoms are well-ordered and positioned within the Fe—B cluster and the Al—Al atomic distance is relatively large. This illustrates the approach of limiting the depletion of Al by introducing a diffusion barrier composed of an ordered intermetallic phase with a very limited solubility of Al (e.g., Fe-based borides, silicides) or ternary-based aluminides where the Al atomic sites are highly ordered or isolated (i.e., the first atomic nearest neighbors are not Al atoms). In such an approach, the diffusion of the Al into the substrate can be altered to a more constrained/tortuous pathway. In other words, with this approach, a kinetic biasing is applied to the Al diffusion pathways and the coating lifetime can be extended significantly.

The intermetallics that can form in the corrosion and diffusion barriers are determined by the isothermal section of a ternary phase diagram for the system comprising the alloying element, the co- or sequentially deposited diffusion barrier-forming element, and the substrate alloy metal element. By way of illustration, FIGS. 5-7 show the isothermal sections and schematic, cross-sectional views of integrated coating structures made using aluminum as the alloying element and B (FIG. 5), Si (FIG. 6), and Cr (FIG. 7) as the simple metal or metalloid.

Figure 5:
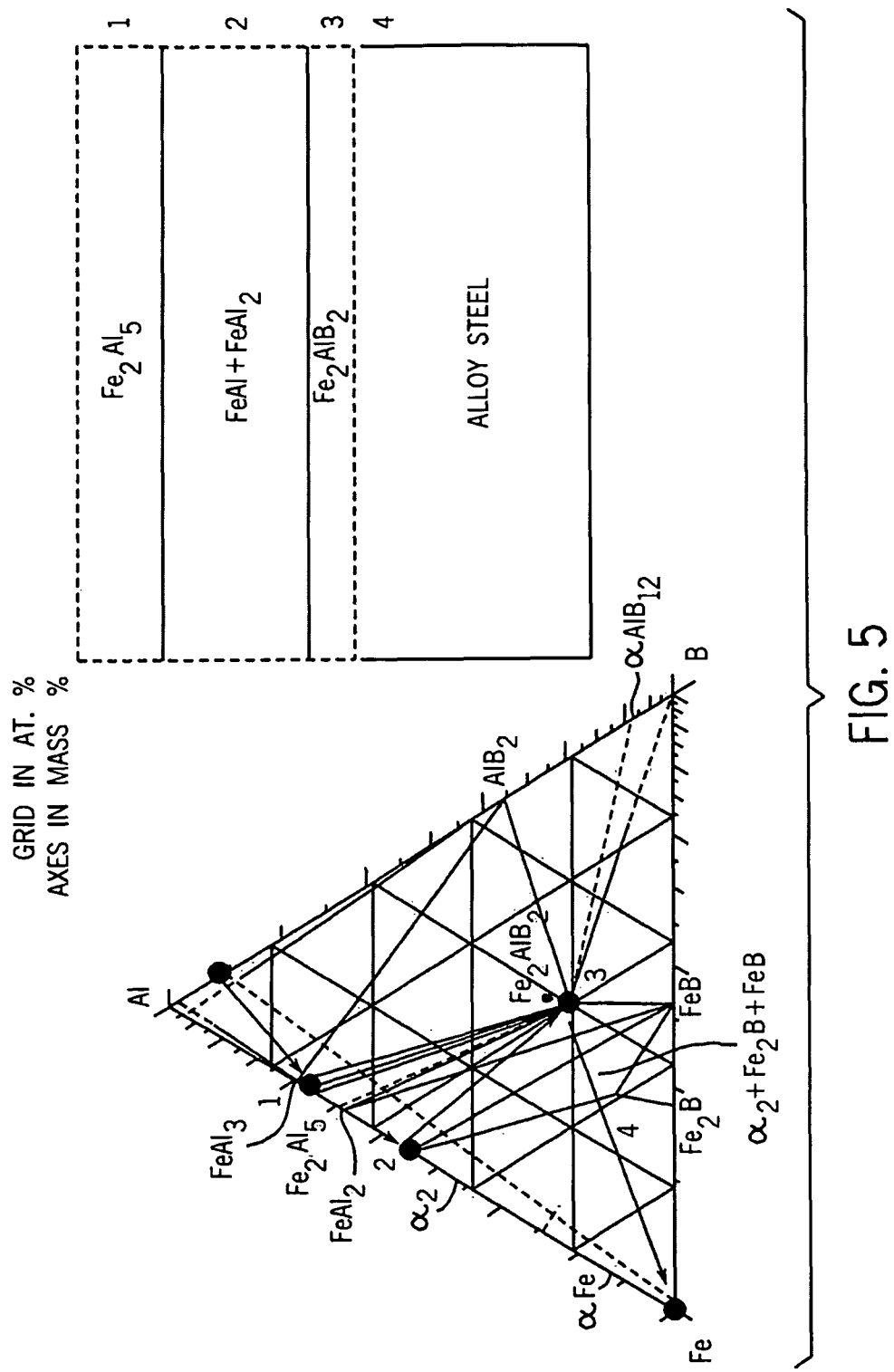
FIG. 5 shows the Fe—Al—B isothermal section at 800° C. with the reaction pathway 1→2→3→4 labeled and a cross-sectional view of an integrated coating structure with a ternary Fe—Al—B boride compound as a diffusion barrier and having a layer sequence of $Al_5Fe_2$/FeAl+$FeAl_2$/$Fe_2AlB_2$.

FIG. 5 shows the Fe—Al—B isothermal section at 800° C. and an example of an integrated coating structure that can be realized using a co-pack deposition of Al and B or a sequential pack deposition of Al and B on a steel substrate. The structure includes a diffusion barrier comprising a ternary boroaluminide phase ($Fe_2AlB_2$) and a corrosion resistant layer comprising a stratum of $Al_5Fe_2$ over a stratum of FeAl and $FeAl_2$.

Figure 6:
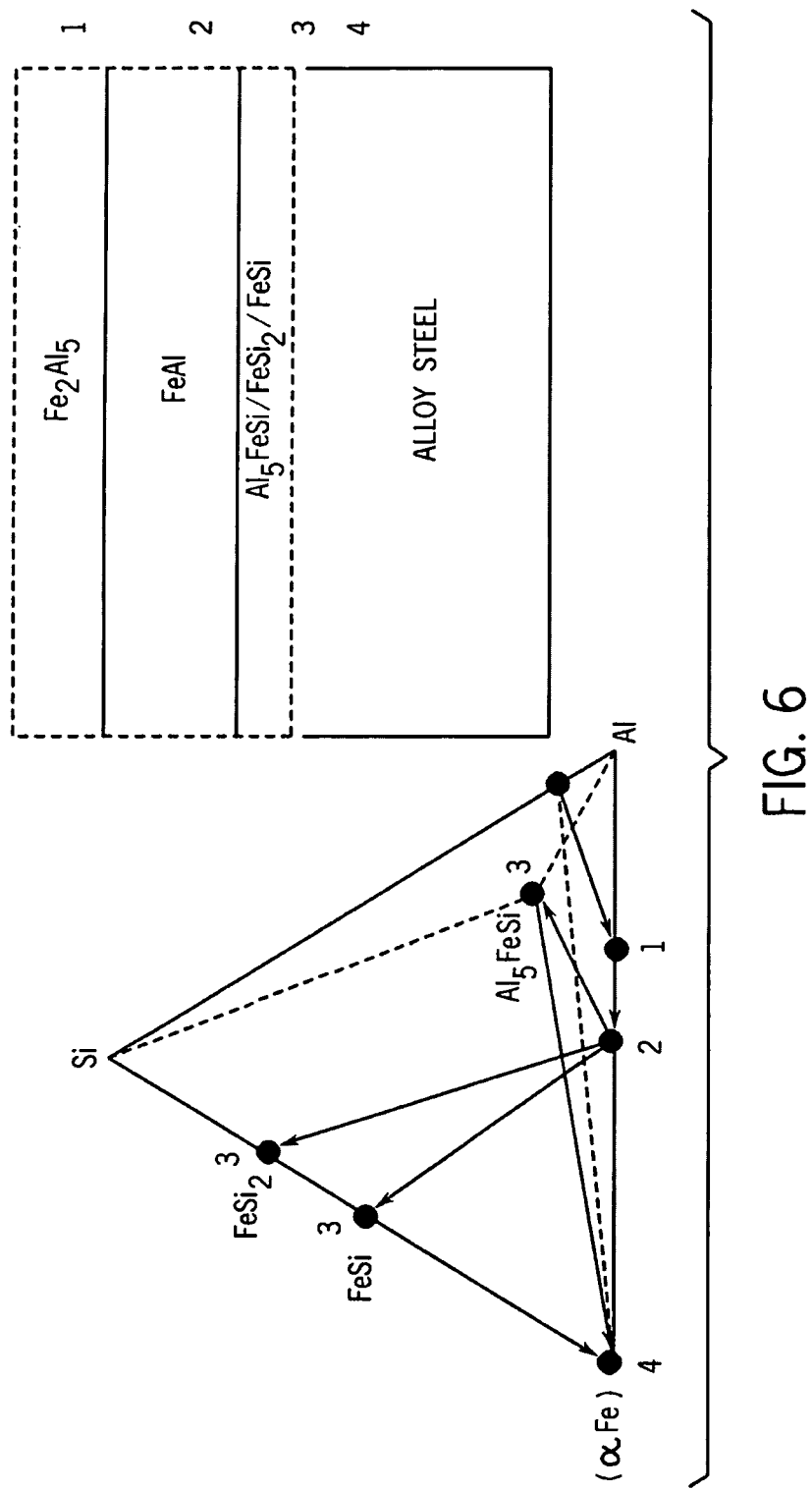
FIG. 6 shows the Fe—Al—Si isothermal and a cross-sectional view of an integrated coating structure with either a series of binary Fe—Si compounds or a ternary $Al_5FeSi$ compound as a diffusion barrier.

FIG. 6 shows the Fe—Al—Si isothermal section and an example of an integrated coating structure that can be realized using a co-pack deposition of Al and Si or a sequential pack deposition of Al and Si on a steel substrate. The structure includes a diffusion barrier comprising a ternary aluminosilicide phase ($Al_5FeSi$) and/or a series of binary iron silicide compounds (FeSi and $FeSi_2$) and a corrosion resistant layer comprising a stratum of $Al_5Fe_2$ over a stratum of FeAl. The reaction pathways 1→2→3→4 are indicated. Three options for path 3 are possible, depending on the relative kinetics and processing conditions.

Figure 7:
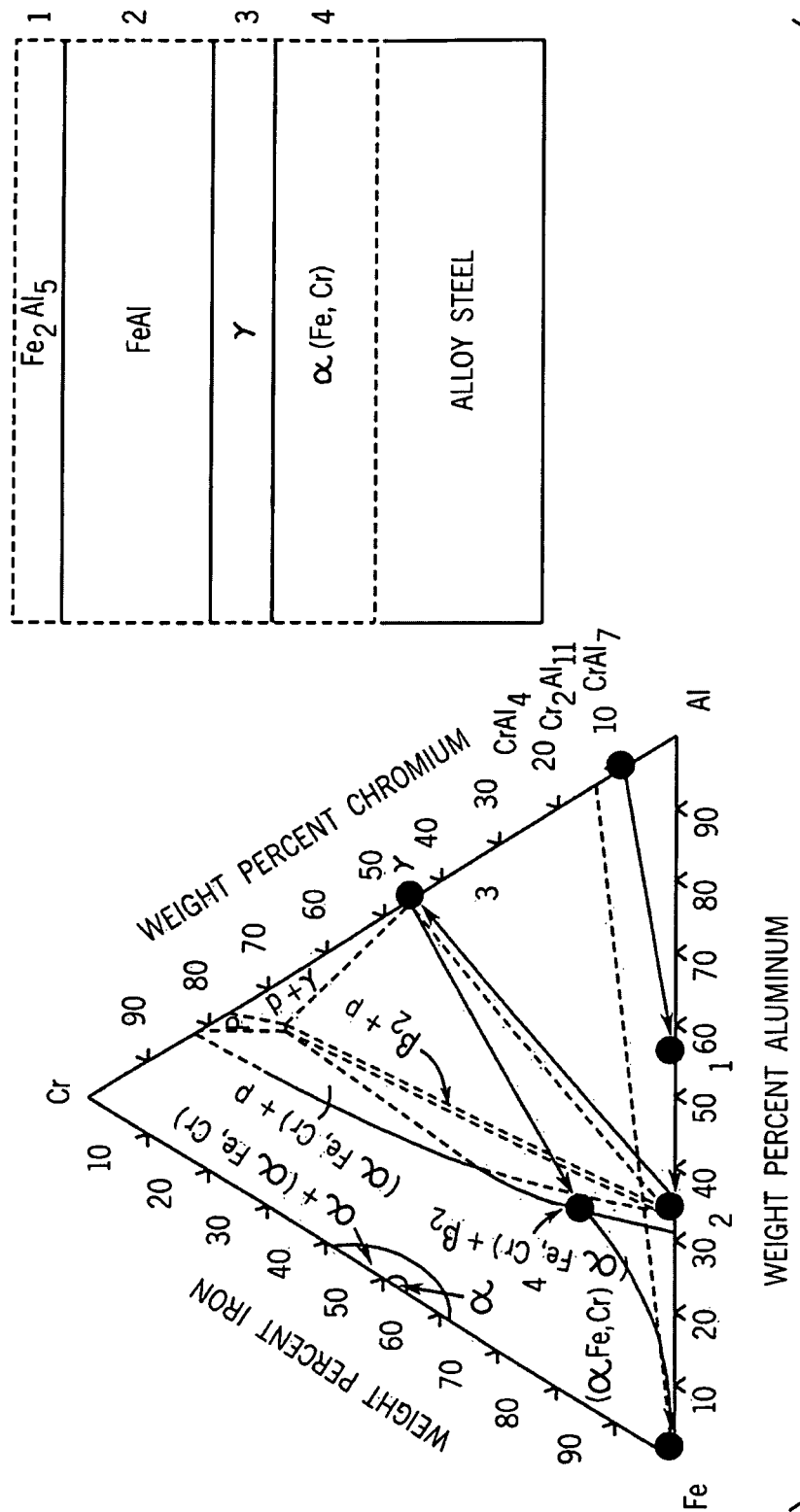
FIG. 7 shows the Fe—Al—Cr isothermal section at 750° C. and a cross-sectional view of an integrated coating structure with Cr—Al intermetallics as the diffusion barrier.

FIG. 7 shows the Fe—Al—Cr isothermal section and an example of an integrated coating structure that can be realized using a co-pack deposition of Al and Cr or a sequential pack deposition of Al and Cr on a steel substrate. The structure includes a diffusion barrier comprising one or more chromium aluminides and a corrosion resistant layer comprising a stratum of $Al_5Fe_2$ over a stratum of FeAl.

The invention will be further described by reference to the following examples, which are presented for the purpose of illustration only and are not intended to limit the scope of the invention.

EXAMPLES

Example 1

The following example illustrates a method of forming an integrated coating structure on 316 stainless steel via an Al deposition process and a subsequent conditioning step. The stainless steel was a 316 stainless steel, which is an iron-based austenitic alloy with alloying components of Cr (16-18%), Ni (10-14%), and molybdenum (2-3%). A more detailed description of the complete alloying contents of this type of stainless steel can be found in ASM Specialty Handbook: Stainless Steels, J. R. Davis (ed.), published by ASM International (1995). Although 316 is used in this example, the present methods may also be used with other high-temperature steels.

Figure 8C:
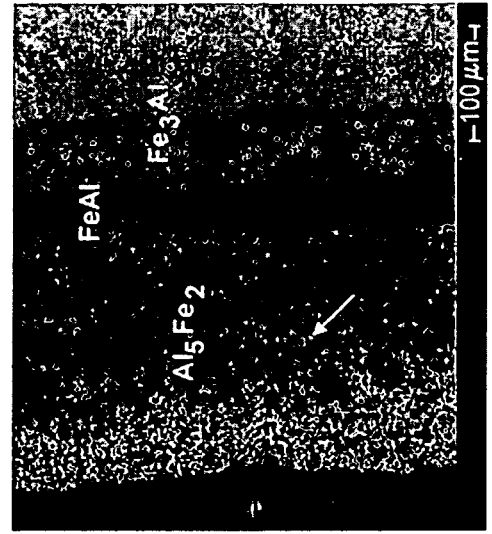
FIG. 8 shows: (a) a backscattered electron (BSE) micrograph of a thick aluminide coating (~300 μm) on 316 stainless steel fabricated using the low-temperature pack cementation process; (b) a BSE micrograph of the coating of FIG. 8(a) after conditioning at 700° C. for 15 hours; (c) a BSE micrograph of a similar coating fabricated using aluminum pack cementation at 650° C. for 15 hours resulting in a layer of $Al_5Fe_2$ having a thickness of more than 100 μm within the coating with dispersions of Al-rich (Cr,Fe,Ni)-aluminides; (d) the energy dispersive x-ray spectrum (EDS) of the $Al_5$(Fe,Cr,Ni)$_2$ phase in the coating of FIG. 8(a) (see arrow)
Figure 8A:
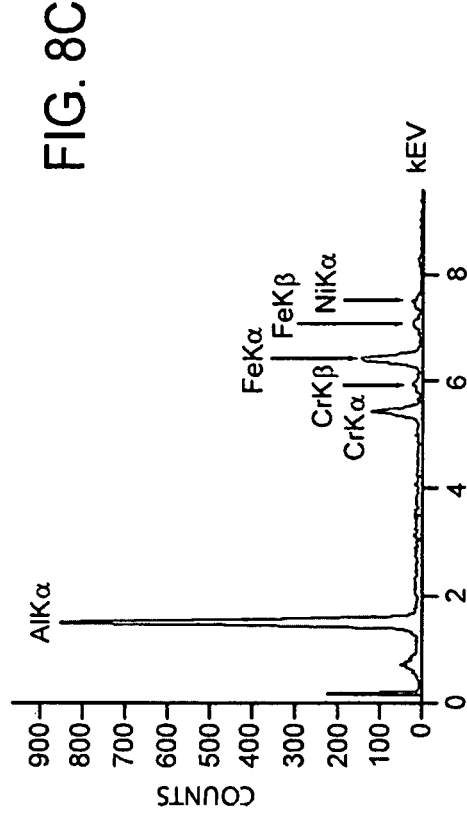
Figure 8D:
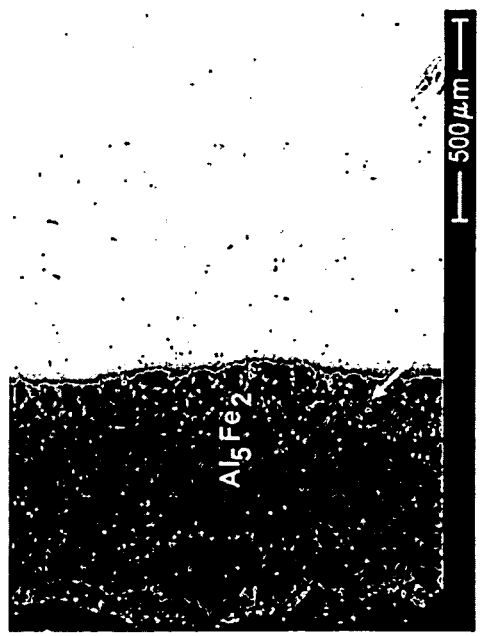
Figure 8B:
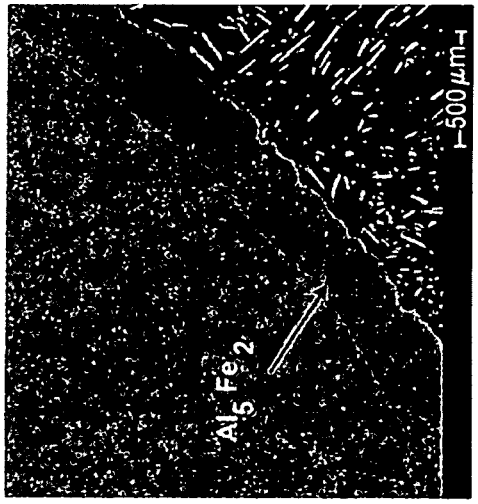

Two integrated coatings were made in this example. The first integrated coated was made by forming an aluminide coating (250-300 μm thick) on the stainless steel substrate using an Al pack process at 700° C. for only 8 hours. FIG. 8a shows a BSE micrograph of the aluminide coating. The resulting coating was subsequently annealed in air at a service temperature of 700° C. for 8 hours (FIG. 8b).

The second integrated coating was fabricated by forming an $Al_5Fe_2$-containing coating of with a thickness of greater than 100 μm by applying the same pack treatment at 650° C. for 15 hours. FIG. 8c shows a BSE micrograph of the coating. An EDS analysis of the coating confirms $Al_5Fe_2$ (with some substitution of Fe with Cr and Ni) as the only phase that is present (FIG. 8d).

Example 2

The following example illustrates a method of forming an integrated coating structure on a 316 stainless steel substrate via an Al and Zn co-pack deposition process. The pack deposition process was carried out using Al and Zn (5% Al and 5% Zn) as source elements, $AlCl_3$ and $ZnCl_2$ as activators and alumina as an inert filler. The pack cementation was conducted at a temperature of 500° C. for 2 hours. Deposition was followed by a conditioning treatment carried out at 600° C. for 20 hours in air.

Figure 9C:
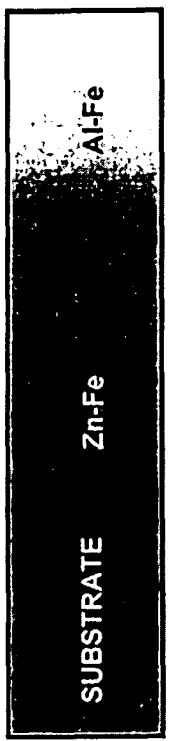
FIG. 9(C) shows a schematic cross-section of the structure.
Figure 9D:
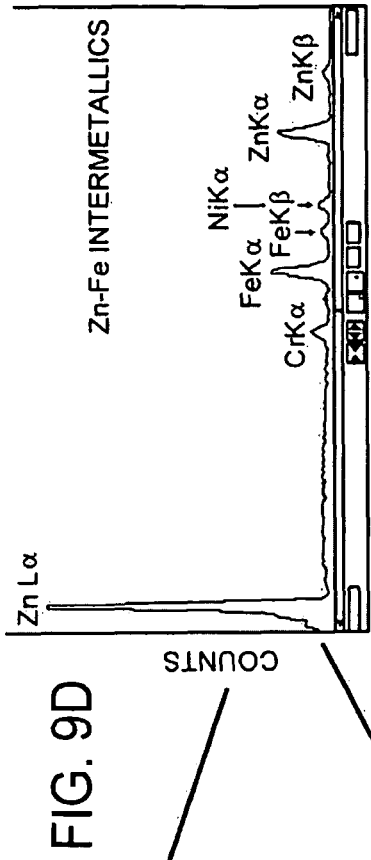
FIGS. 9(D) and (E) show the energy dispersive x-ray spectrum of the corrosion resistant layer and diffusion barrier in the structure.
Figure 9E:
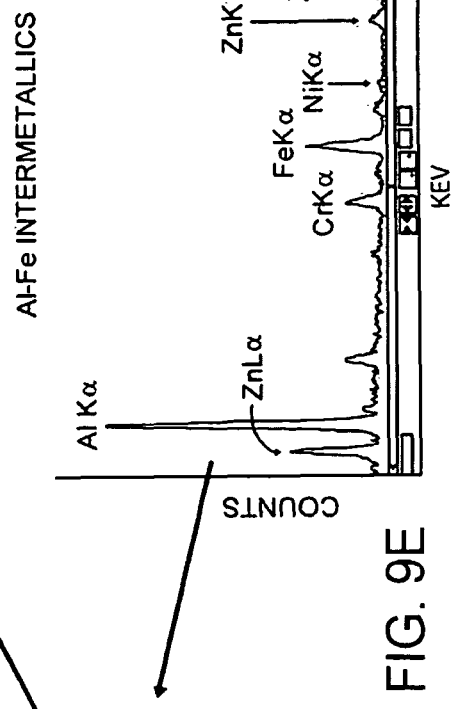
FIGS. 9(A) and (B) show backscattered electron micrograph images of the integrated coating structure of Example 2.
Figure 9A:
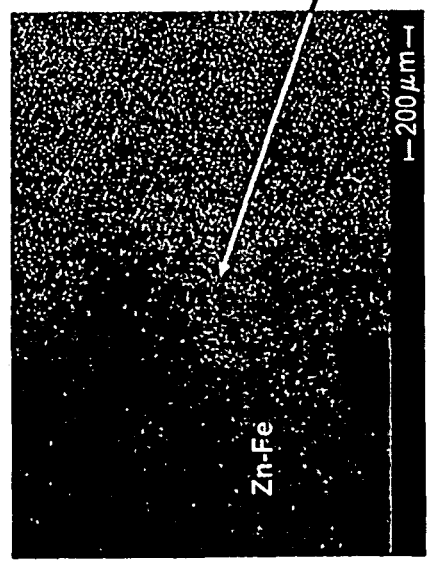
Figure 9B:
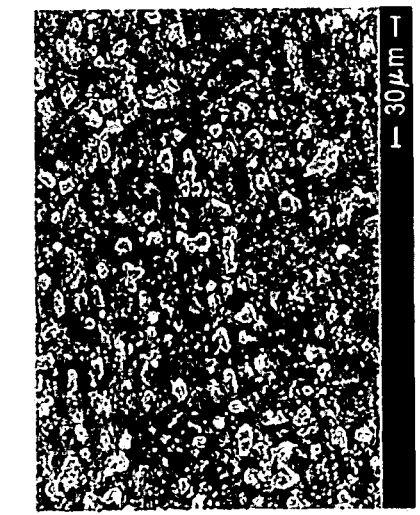

FIGS. 9(A) and (B) show cross-sectional backscattered electron (BSE) micrograph images of portions of the corrosion resistant layer and diffusion barrier of the resulting integrated coating structure, where FIG. 9(B) is a blown-up image of the area delineated by the box in FIG. 9(A). A schematic of a cross-section of the integrated coating structure is depicted in FIG. 9(C), which shows the substrate, a diffusion barrier comprising Zn—Fe intermetallic compounds, and a corrosion resistant layer comprising Al—Fe intermetallic compounds. FIGS. 9(D) and (E) show the energy dispersive x-ray spectra (EDS) of the Zn—Fe intermetallic compounds of the corrosion resistant layer and the Al—Fe intermetallic compounds of the diffusion barrier, respectively, of the integrated coating structure. $Al_5Fe_2$ is included in the Al—Fe intermetallic compounds.

Example 3

Figure 11C:
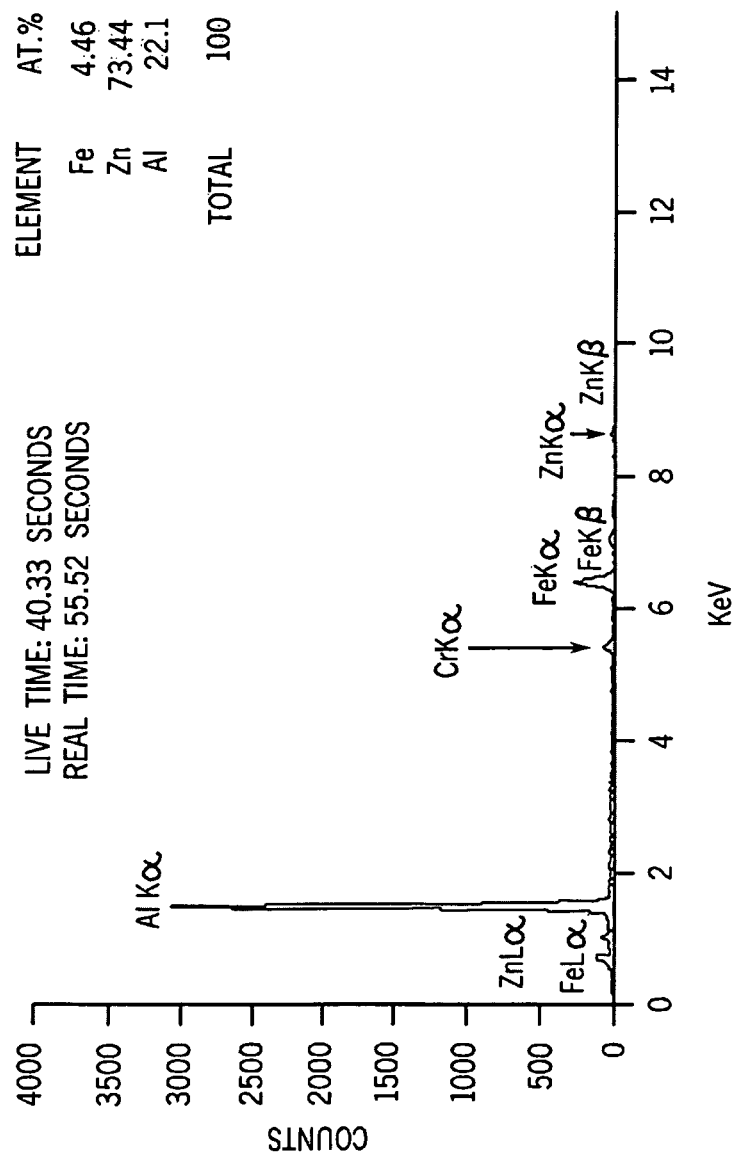
FIG. 11(c) shows an EDS of sub-region "A" confirming the formation of Al-rich Fe-aluminides, and a table showing the high Zn—Al content of sub-region "B".

A series of additional co-deposition experiments were carried out on stainless steel using a different type of activator (i.e., $NH_4Cl$ of 10 wt. %) in a pack cementation process using 40-45 wt. % Zn and 10 wt. % Al with a balance of alumina at temperature of 550° C. for 20 hours. FIG. 10(a) shows an SEM of a coating structure made with 40 wt. % Zn and 10 wt. % Al powders. FIG. 10(b)-(e) show EDS spectra of the various layers in the coating structure of FIG. 10(a). FIG. 11(a) shows SEM images of a coating structure made with 45 wt. % Zn and 5 wt. % Al powders. More specifically, FIG. 11(a) shows a layer of: (1) mixed Al-rich Fe-aluminide and a Zn—Al-rich region; and (2) Zn-saturated $Al_5Fe_2$. FIG. 11(b) shows a higher magnification of the region (1) comprised of sub-regions "A" & "B". FIG. 11(c) shows an EDS of sub-region "A" confirming the formation of Al-rich Fe-aluminides (Al-rich $Al_5Fe_2$), and a table showing the high Zn—Al content of sub-region "B".

Figure 12:
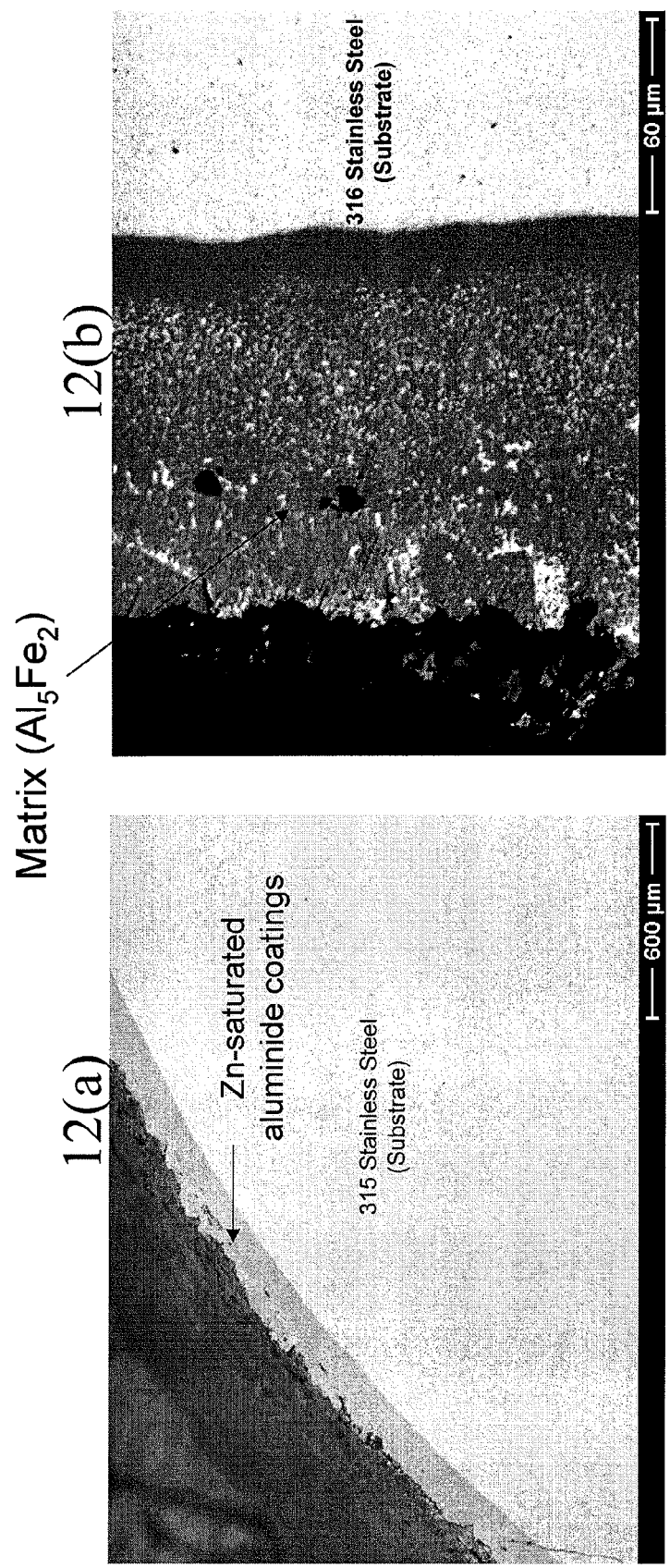
FIG. 12 shows: (a) an SEM of a cross section of the aluminide coating of FIG. 11 after conditioning at 600° C. for 20 hours; and (b) an SEM with a higher magnification showing the aluminide matrix with dispersed (Zn—Al) regions.

Subsequent conditioning at 700° C. resulted in the formation of Zn-based intermetallics in the Zn—Al rich area, as shown in the SEM images of FIGS. 12(a) and (b). These intermetallics form a diffusion barrier for Al.

For the purposes of this disclosure, and unless otherwise specified, "a" or "an" means "one or more." All patents, applications, references and publications cited herein are incorporated by reference in their entirety to the same extent as if they were individually incorporated by reference.

It is understood that the invention is not limited to the embodiments set forth herein for illustration, but embraces all such forms thereof as come within the scope of the following claims.

What is claimed is:

1. An integrated coating structure comprising:
   (a) a substrate alloy comprising metal elements; and
   (b) a coating integrated with a surface of the substrate alloy, the coating comprising: a first element that is a metal element of the substrate alloy, a second element characterized in that it is capable of reacting with the first element to form an intermetallic compound and a third element that is a metal or metalloid; wherein the coating has:
      (i) a corrosion resistant layer comprising a first intermetallic compound comprising the first and second elements, the first intermetallic compound having a defect structure comprising constitutional vacancies for atoms of the second element, wherein the constitutional vacancies allow for the enhanced diffusion of the atoms of the second element through the first intermetallic compound relative to their diffusion through a diffusion barrier layer; and
      (ii) the diffusion barrier underlying the corrosion resistant layer and integrated into the surface of the substrate alloy, the diffusion barrier comprising a second intermetallic compound comprising the first element and the third element, the second intermetallic compound having a structure comprising fewer constitutional vacancies for atoms of the second element than the defect structure of the first intermetallic compound, such that the diffusion barrier hinders the diffusion of the atoms of the second element through the diffusion barrier relative to their diffusion through the corrosion resistant layer.

2. The structure of claim 1, wherein the metal or metalloid is selected from the group consisting of Group IB, Group VIII, Group IIIA, Group IVA, Group VA and Group VB of the periodic table.

3. The structure of claim 2, wherein the substrate alloy comprises a ferrous alloy and the atoms of the second element are aluminum atoms.

4. The structure of claim 3, wherein the intermetallic compound having a defect structure is $Al_5Fe_2$.

5. The structure of claim 4, wherein the diffusion barrier comprises one or more intermetallic compounds of iron and zinc.

6. The structure of claim 4, wherein the diffusion barrier comprises a ternary intermetallic compound of iron, aluminum and boron.

7. The structure of claim 4, wherein the diffusion barrier comprises a binary intermetallic compound of iron and silicon.

8. The structure of claim 4, wherein the diffusion barrier comprises a ternary intermetallic compound of iron, aluminum and silicon.

9. The structure of claim 1, wherein the substrate alloy comprises a Cr—Mo-steel.

10. The structure of claim 1, wherein the substrate alloy comprises a nickel alloy or a refractory metal alloy.

11. The structure of claim 1 further comprising an oxidation barrier comprising an oxide on an external surface of the corrosion resistant layer.

12. The structure of claim 1 wherein the coating integrated into the surface has a thickness of at least about 100 μm.

13. The structure of claim 1, wherein the substrate alloy comprises steel.

14. The structure of claim 1, wherein the second element is aluminum, the first element is iron and the third element is selected from the group consisting of Group IB, Group VIII, Group IIIA, Group IVA, Group VA and Group VB of the periodic table.

15. The structure of claim 1, wherein the second element is selected from the group consisting of silicon, chromium, boron and titanium.

16. The structure of claim 1, wherein the intermetallic compound having a defect structure is an aluminum-rich aluminide having constitutional vacancies for aluminum atoms and the substrate alloy comprises steel.

17. The structure of claim 1, wherein the intermetallic compound of the diffusion barrier layer further comprises the second element.

18. The structure of claim 1, wherein the first intermetallic compound comprises the majority phase in the corrosion resistant layer.

19. An integrated coating structure comprising:
(a) a substrate comprising a steel alloy; and
(b) a corrosion resistant coating integrated with a surface of the substrate, the coating comprising:
 (i) a corrosion resistant layer comprising $Al_5Fe_2$ comprising constitutional vacancies for aluminum atoms; and
 (ii) a diffusion barrier layer underlying the corrosion resistant layer and integrated into the surface of the substrate, wherein the diffusion barrier layer hinders the diffusion of atoms that occurs via constitutional vacancies for aluminum atoms relative to their diffusion through the corrosion resistant layer that occurs via constitutional vacancies for aluminum atoms, the diffusion barrier layer comprising at least one intermetallic compound comprising at least one metal or metalloid selected from the group consisting of Group IB, Group VIII, Group IIIA, Group IVA, Group VA and Group VB of the periodic table in addition to at least one of aluminum or iron, wherein said intermetallic compound has a structure comprising fewer constitutional vacancies for aluminum atoms than $Al_5Fe_2$.

20. The structure of claim 19, wherein the diffusion barrier layer comprises one or more intermetallic compounds of iron and zinc.

21. The structure of claim 19, wherein the diffusion barrier layer comprises $Fe_2AlB_2$.

22. The structure of claim 19, wherein diffusion barrier layer comprises at least one of $Al_5FeSi$, FeSi or $FeSi_2$.

23. The structure of claim 19 further comprising an oxidation barrier comprising alumina on an external surface of the corrosion resistant layer.

24. The structure of claim 19, wherein the metal or metalloid is selected from the group consisting of B, Si and Cr.

25. The structure of claim 19, wherein $Al_5Fe_2$ is the majority phase in the corrosion resistant layer.

26. An integrated coating structure comprising:
(a) a substrate alloy comprising metal elements, the alloy characterized in that it is susceptible to oxidation in a steam environment at temperatures in the range from about 500° C. to about 700° C.; and
(b) a coating integrated with a surface of the substrate alloy, the coating comprising: a metal element of the substrate alloy, aluminum and a third element that is a metal or metalloid selected from the group consisting of Group IB, Group VIII, Group IIIA, Group IVA, Group VA and Group VB of the periodic table; wherein the coating has:
 (i) a corrosion resistant layer comprising a first intermetallic compound comprising the metal element of the substrate alloy and aluminum, the first intermetallic compound having a defect structure comprising constitutional vacancies that allow for the diffusion of aluminum atoms through the first intermetallic compound; and
 (ii) a diffusion barrier underlying the corrosion resistant layer and integrated into the surface of the substrate alloy, the diffusion barrier comprising a second intermetallic compound comprising the metal element of the substrate alloy and the metal or metalloid selected from the group consisting of Group IB, Group VIII, Group IIIA, Group IVA, Group VA and Group VB of the periodic table, the second intermetallic compound having a structure comprising fewer constitutional vacancies that allow for the diffusion of aluminum atoms than the defect structure of the first intermetallic compound, such that the diffusion barrier hinders the diffusion of aluminum atoms through the diffusion barrier relative to their diffusion through the corrosion resistant layer.

27. The structure of claim 26, wherein the substrate alloy comprises steel.

28. The structure of claim 26, wherein the substrate alloy is a refractory metal alloy.

29. The structure of claim 26, wherein the substrate alloy is a nickel alloy.

30. The structure of claim 26, wherein the metal or metalloid is selected from the group consisting of Si, C, B, Ge, Ga, Cr, N and P.

31. The structure of claim 26, wherein the first intermetallic compound comprises the majority phase in the corrosion resistant layer.

* * * * *

UNITED STATES PATENT AND TRADEMARK OFFICE
CERTIFICATE OF CORRECTION

PATENT NO. : 8,795,845 B2  Page 1 of 1
APPLICATION NO. : 12/268153
DATED : August 5, 2014
INVENTOR(S) : John Harry Perepezko et al.

It is certified that error appears in the above-identified patent and that said Letters Patent is hereby corrected as shown below:

IN THE CLAIMS

Col. 11, Line 52 (claim 22)
Delete "wherein diffusion" and replace with --wherein the diffusion--

Signed and Sealed this
Thirty-first Day of March, 2015

Michelle K. Lee
*Director of the United States Patent and Trademark Office*